United States Patent
Cheng et al.

(10) Patent No.: US 9,586,355 B2
(45) Date of Patent: Mar. 7, 2017

(54) DYNAMICALLY VULCANIZED THERMOPLASTIC ELASTOMER FILM

(75) Inventors: Jianya John Cheng, Kingwood, TX (US); Prashant Arun Bhadane, Montreal (CA); Basil D. Favis, Kirkland (CA); Dennis Kumor, Copley, OH (US); Maria Dolores Ellul, Silver Lake Village, OH (US); Peter William Manders, Hudson, OH (US); Porter Clarke Shannon, Seabrook, TX (US); Dirk Frans Rouckhout, Grotesteenweg (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 998 days.

(21) Appl. No.: 13/046,177

(22) Filed: Mar. 11, 2011

(65) Prior Publication Data

US 2012/0232210 A1  Sep. 13, 2012

(51) Int. Cl.
*B29C 47/92* (2006.01)
*B29C 47/00* (2006.01)
(Continued)

(52) U.S. Cl.
CPC .......... *B29C 47/008* (2013.01); *B29B 7/7495* (2013.01); *B29C 47/0007* (2013.01);
(Continued)

(58) Field of Classification Search
CPC ......... C08J 3/005; C08J 3/24; B29C 47/0021; B29C 47/004; B29C 43/04; B29C 43/06;
(Continued)

(56) References Cited

U.S. PATENT DOCUMENTS

| 5,158,986 A | 10/1992 | Cha et al. |
| 5,866,053 A | 2/1999 | Park et al. |

(Continued)

FOREIGN PATENT DOCUMENTS

| CN | 101219573 A * | 7/2008 |
| CN | 101445612 | 7/2008 |

(Continued)

OTHER PUBLICATIONS

U.S. Appl. No. 12/548,797, filed Aug. 27, 2009; Inventors: Ellul et al., "Adhesive Extrusion for Elastomeric Compositions and Their Use in Articles".

(Continued)

*Primary Examiner* — Atul P. Khare
(74) *Attorney, Agent, or Firm* — Nancy T. Krawczyk (57) ABSTRACT

A dynamically vulcanized alloy containing an elastomer and a thermoplastic resin is prepared by a process wherein supercritical fluid is injected into the thermoplastic elastomeric material as the material is mixed in an extruder. The material is mixed under conditions such that the thermoplastic elastomeric material is dynamically vulcanized wherein the elastomer forms a discontinuous dispersed of small particles in a continuous phase of the thermoplastic resin. The DVA material may then be directly formed into film or sheets by the use of at least one set of rolls located adjacent to the extruder outlet.

4 Claims, 3 Drawing Sheets

(51) Int. Cl.

| | |
|---|---|
| *B29C 47/36* | (2006.01) |
| *B29C 47/08* | (2006.01) |
| *B60C 1/00* | (2006.01) |
| *C08J 3/00* | (2006.01) |
| *C08L 21/00* | (2006.01) |
| *C08L 23/20* | (2006.01) |
| *C08L 23/28* | (2006.01) |
| *B29B 7/74* | (2006.01) |
| *B29C 47/88* | (2006.01) |
| *B29C 47/10* | (2006.01) |
| *B29L 30/00* | (2006.01) |
| *C08L 29/04* | (2006.01) |
| *C08L 31/04* | (2006.01) |
| *C08L 77/02* | (2006.01) |
| *B29B 7/38* | (2006.01) |
| *B29K 21/00* | (2006.01) |
| *B29C 47/54* | (2006.01) |
| *B29C 47/76* | (2006.01) |
| *B29K 105/24* | (2006.01) |

(52) U.S. Cl.
CPC ...... *B29C 47/0021* (2013.01); *B29C 47/0869* (2013.01); *B29C 47/1072* (2013.01); *B29C 47/36* (2013.01); *B29C 47/8805* (2013.01); *B29C 47/8845* (2013.01); *B29C 47/8895* (2013.01); *B29C 47/92* (2013.01); *B60C 1/0008* (2013.04); *C08J 3/005* (2013.01); *C08L 21/00* (2013.01); *C08L 23/20* (2013.01); *C08L 23/283* (2013.01); *B29B 7/38* (2013.01); *B29C 47/54* (2013.01); *B29C 47/767* (2013.01); *B29K 2021/003* (2013.01); *B29K 2105/24* (2013.01); *B29K 2105/246* (2013.01); *C08J 2300/26* (2013.01); *C08J 2321/00* (2013.01); *C08J 2323/20* (2013.01); *C08J 2400/22* (2013.01); *C08L 29/04* (2013.01); *C08L 31/04* (2013.01); *C08L 77/02* (2013.01); *Y02P 20/544* (2015.11)

(58) Field of Classification Search
CPC ... B29C 43/08; B29C 43/085; B29C 47/0007; B29C 47/008; B29C 47/0869; B29C 47/1072; B29C 47/36; B29C 47/92
USPC ............ 264/210.2, 211, 211.23, 211.24
See application file for complete search history.

(56) References Cited

U.S. PATENT DOCUMENTS

| | | | |
|---|---|---|---|
| 5,910,544 A | 6/1999 | Ozawa et al. | |
| 6,180,037 B1* | 1/2001 | Andersen et al. | 264/108 |
| 6,402,867 B1* | 6/2002 | Kaido et al. | 156/123 |
| 6,617,383 B2 | 9/2003 | Ikawa et al. | |
| 6,966,999 B2* | 11/2005 | Tsou et al. | 264/291 |
| 7,319,121 B2* | 1/2008 | Jacob | C08J 9/0061 525/93 |
| 7,511,106 B2* | 3/2009 | Ravishankar | 526/160 |
| 7,709,575 B2* | 5/2010 | Tsou et al. | 525/178 |
| 7,799,873 B2 | 9/2010 | Soeda | |
| 2004/0084795 A1* | 5/2004 | Hornsby | B01J 3/008 264/41 |
| 2004/0249009 A1 | 12/2004 | Homma et al. | |
| 2007/0254035 A1* | 11/2007 | Hao | B01J 3/008 424/486 |
| 2008/0314491 A1 | 12/2008 | Soeda et al. | |
| 2008/0314493 A1* | 12/2008 | Hara | 152/510 |
| 2012/0035325 A1 | 2/2012 | Ellul | |
| 2012/0199273 A1* | 8/2012 | Porter | B29B 13/023 156/110.1 |

FOREIGN PATENT DOCUMENTS

| | | | |
|---|---|---|---|
| CN | 101445612 A * | 6/2009 | |
| EP | 722850 | 5/1999 | |
| EP | 969039 | 1/2000 | |
| EP | 857761 | 1/2007 | |
| JP | 755929 | 9/1996 | |
| JP | 11-310656 | 11/1999 | |
| JP | 2002322288 A * | 11/2002 | |
| JP | 4131091 | 8/2008 | |
| JP | 2010 235703 | 10/2010 | |
| JP | 2010235703 A | 10/2010 | |
| WO | WO2008/060302 | 5/2008 | |
| WO | WO 2008/060302 | 5/2008 | |

OTHER PUBLICATIONS

U.S. Appl. No. 12/838,076, filed Jul. 16, 2010; Inventors: Caraway et al., "Adhesive Extrusion for Dynamically Vulcanized Thermoplastic Elastomer Laminates".

* cited by examiner

DYNAMICALLY VULCANIZED THERMOPLASTIC ELASTOMER FILM

FIELD OF THE INVENTION

The present invention relates to thermoplastic elastomeric compositions. More particularly, the present invention is directed to a method of forming a dynamically vulcanized thermoplastic elastomeric film.

BACKGROUND OF THE INVENTION

The present invention relates to thermoplastic elastomer compositions particularly useful for tire and other industrial rubber applications and processes for producing such compositions.

EP722850B1 discloses a low-permeability thermoplastic elastomer composition that is superior as a gas-barrier layer in pneumatic tires. This thermoplastic elastomer composition comprises a low-permeability thermoplastic matrix, such as polyamide or a blend of polyamides, in which there is dispersed a low-permeability rubber, such as brominated poly(isobutylene-co-paramethylstyrene), referred to hereinafter as BIMSM. In EP857761A1 and EP969039A1, the viscosity ratio of the thermoplastic matrix and the dispersed rubber phase was specified both as a function of the volume fraction ratio and, independently, to be close to a value of one in order to produce a high concentration of small particle size vulcanized rubber particles dispersed in a thermoplastic phase. EP969039A1 further discloses that small particle size rubber dispersed in a thermoplastic resin matrix was important in order to achieve acceptable durability of the resulting composition, particularly where such compositions are intended to be used as innerliners in pneumatic tires.

Compositions exhibiting low gas permeability performance (i.e., functioning as a gas barrier) composed of thermoplastic resin/thermoplastic resin-based blends such as a high density polyethylene resin and nylon 6 or nylon 66 (HDPE/PA6.66), a polyethylene terephthalate and aromatic nylon (PET/MXD6), a polyethylene terephthalate and vinyl alcohol-ethylene copolymer (PET/EVOH), where one thermoplastic resin is layered over the other layer to form plural layers by molding, and processes for producing the same have been proposed. An application regarding the use of such a composition as the innerliner layer of a tire is disclosed in Japanese Patent Application No. 7-55929. However, since these materials are thermoplastic resin/thermoplastic resin blends, while they are superior in gas barrier performance, they lack flexibility, and therefore, such films are subject to failure if they are used in a vehicle tire which is subject to significant flexing.

In many of the known thermoplastic elastomeric materials that are obtained via dynamic vulcanization (i.e. DVAs), to disperse the minor component in the DVA process wherein the minor component of the blend forms the continuous domain in the DVA and to facilitate extrusion manufacturing processes, a relatively high level of plasticizer (as a fraction of the nylon component, and in relation to the amount of plasticizer typically employed in plasticized nylons) has been used in the DVA compositions. However, a high level of plasticizer may not be desirable for the end product as the excess plasticizer may leach to the surface of the material and cause problems in storage of the unprocessed material, in extrusion, and in subsequent processing of the film. Residual plasticizer may also reduce impermeability characteristics of the material, reducing its effectiveness for use as a barrier material.

Past attempts to address this issue have included reduction of the plasticizer; however, the material must still be readily converted to a film using conventional extrusion processes. Even the remaining low levels of plasticizer may still have leaching issues, as well as some volatizing of the plasticizer during the processing. Capture of volatized plasticizer is possible, but is not an easy process and requires retrofitting for manufacturing. Additionally, any process involving capture of volatized plasticizer must take into consideration if the DVA is co-extruded with an adhesive material. In such a process, the adhesive must be tolerant of the drying conditions or it will require the adhesive to be applied as a separate operation after the film has been dried.

The inventors have observed that the stiffness of a DVA melt increases with time and temperature under stagnant conditions and decreases under some straining conditions. This is believed to be an undesirable characteristic for film conversion as it leads to divergence of the melt properties in an extrusion system that has a distribution of residence times and strain rates, and involves free-surface flows. If the 'stagnation-stiffening' is due to forces between the rubber particles, the effect can be anticipated to be more pronounced when the volume ratio of rubber to plastics in the DVA material is higher, as would be the situation when the amount of plasticizer is reduced in the DVA formulation.

The fundamental reason that conventional extrusion processes cannot readily be used with pellets that contain very reduced or no plasticizer is that, even if the material can be extruded, the viscosity of the material is so high, that when combined with the extrusion process, the material is degraded due to shear heating; one alternative is extrusion at uneconomically slow rates. The pressure of the melt acts on the full cross-sectional area of the extruder barrel so the forces developed in the attachment between extruder and downstream hardware become excessive. Also, in a blown film stacked die configuration the forces developed between the die elements increase as the second power of the die diameter, which means that high melt viscosity and the high melt pressure resulting may limit the layflat dimension of the bubble. This type of die is preferred for simultaneous extrusion of DVA and adhesive. Lastly, passage of the melt through a narrow die gap leads to excessively high pressures or unacceptably low throughput rates. Larger die gaps are not possible because the material has insufficient draw-down capability.

In using DVAs as barrier materials, especially as tire innerliners, the DVA material must provide an optimum balance of barrier properties and low temperature fatigue life. Fatigue life is improved as the rubber particle size in the thermoplastic resin domain is reduced. However, the particle size typical in DVA extrusion is relatively insensitive to process conditions. It is also believed that the elongation and possible orientation of the film structure in the film conversion process and tire building improve the barrier property, but although the melt undergoes a very high draw-down, the rubber particles are substantially less elongated, so it is possible a more significant improvement in the balance of fatigue life and barrier properties may be achieved if the rubber particles could be reduced in size and more oriented than is possible with the forces, times, and temperatures that are practical in a conventional film extrusion process.

SUMMARY OF THE INVENTION

The present invention is directed to a process of preparing a DVA material, wherein the DVA has improved processability as the material is being compounded in the mixer or as the DVA is being processed into a film. The resulting DVA exhibits improved drawability and film properties.

Disclosed herein is a process to form the thermoplastic elastomeric material, also referred to as the DVA. The thermoplastic elastomer contains an elastomer and a thermoplastic resin, the elastomer and the thermoplastic resin being present in a weight ratio in the range of 55:45 to 80:20. The process includes injecting a supercritical fluid into the thermoplastic elastomeric material as the material is mixed in an extruder and mixing the material under conditions such that the thermoplastic elastomeric material is dynamically vulcanized wherein the elastomer forms a discontinuous dispersed of small particles in a continuous phase of the thermoplastic resin. The use of the supercritical fluid enables a reduction in the amount of plasticizer used in the composition.

In one disclosed aspect of the invention, the supercritical fluid is an inert gas. To use the inert gas as a supercritical fluid, the pressure in the extruder is maintained above the supercritical pressure of the gas. The temperature in the extruder is also, preferably, maintained above the supercritical temperature of the gas; due to the melt temperature in the extruder, this is usually already a condition present in the mixer. In certain embodiments, the supercritical gas is selected from carbon dioxide, nitrogen gas, helium, or hydrogen gas.

In one disclosed aspect of the invention, the supercritical fluid is injected in the extruder downstream of an inlet feeder for the elastomer and thermoplastic resin.

Also disclosed herein is a process to directly form a DVA material into a film as the DVA exits the extruder. The DVA film may be a composition prepared using the supercritical fluid in the extruder, or another composition wherein the amount of plasticizer in the final film is reduced either prior to the composition entering the extruder, as the material passes through the extruder, or as the DVA is formed into a film. If the extruder is used to masticate already prepared pellets of DVA, the plasticizer may have been reduced after pelletization or prior to mastication.

In one disclosed aspect of film forming of the DVA, the film passes through at least one set of rolls wherein the cross-sectional thickness of the film is reduced. In one embodiment, the thermoplastic elastomeric film, prior to reduction of the cross-sectional thickness, has a thickness in the range of 0.1 to 10 mm. In another aspect, the cross-sectional thickness of the thermoplastic elastomeric film is reduced by at least 50% after it passes through the at least one set of rolls. In yet another aspect, the reduced cross-sectional thickness of the thermoplastic elastomeric film is in the range of 0.01 to 0.95 mm.

In one aspect of the disclosed invention, as the film passes through the at least one set of rolls, a layer of adhesive is applied to at least one facing surface of the film.

In the disclosed DVA, the elastomer component of the DVA is derived from $C_4$ to $C_{12}$ isoolefin monomers and the thermoplastic resin is selected from the group consisting of polyamide resins, polyester resins, polynitrile resins, polymethacrylate resins, polyvinyl resins, cellulose resins, fluorine resins, polyimide resins, polysulfones, polyacetals, polyactones, styrene-maleic anhydrides, aromatic polyketones, and mixtures thereof.

Also disclosed are barrier films made from the DVA.

BRIEF DESCRIPTION OF THE DRAWINGS

The invention will be described by way of example and with reference to the accompanying drawings in which.

DETAILED DESCRIPTION

Preferred applications of the present invention relate to thermoplastic elastomer compositions for tire innerliner and barrier films, more particularly to thermoplastic elastomer compositions exhibiting excellent durability and impermeability to fluids such as air, as well as to liquids. Additionally, particularly preferred aspects of the invention relate to efficient mixing processes suitable for producing a thermoplastic elastomer composition capable of providing a rubber domain comprising small sized particles while such domains are also highly extensible and elastic. Furthermore, the invention includes processes for producing pneumatic tires and hoses using the above compositions. The preferred elastomer exhibits low-permeability and is preferably a polymer such as halogenated isobutylene-containing elastomers and particularly preferred are brominated elastomers, especially brominated paramethylstyrene-co-isobutylene polymers; especially preferred are bromobutyl elastomers exhibiting high content of the structure illustrated hereinafter below; and also preferred are commercial bromobutyl elastomers, or blends thereof with one or more of the aforementioned brominated elastomers with one another or with other polymers.

Throughout the entire specification, including the claims, the following terms shall have the indicated meanings:

The term "phr" is parts per hundred rubber or "parts", and is a measure common in the art wherein components of a composition are measured relative to a total of all of the elastomer components. The total phr or parts for all rubber components, whether one, two, three, or more different rubber components is present in a given recipe is normally defined as 100 phr. All other non-rubber components are ratioed against the 100 parts of rubber and are expressed in phr. This way one can easily compare, for example, the levels of curatives or filler loadings, etc., between different compositions based on the same relative proportion of rubber without the need to recalculate percentages for every component after adjusting levels of only one, or more, component(s).

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon.

Multiolefin refers to any monomer having two double bonds. In a preferred embodiment, the multiolefin is any monomer comprising two conjugated double bonds such as a conjugated diene like isoprene.

Elastomer or elastomers as used herein, refers to any polymer or composition of polymers consistent with the ASTM D1566 definition. The terms may be used interchangeably with the term "rubber(s)."

Substituted refers to the substitution of at least one hydrogen of the chemical compound or constituent.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer-containing composition to be considered "cured," "vulcanized" or "crosslinked." For example, for purposes of the present invention, a tire comprising an innerliner layer composition based on the present invention is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks.

Dynamically Vulcanized Alloy (DVA)

The present invention is directed to a thermoplastic elastomer composition that is dynamically vulcanized, and may be referred to as a dynamically vulcanized alloy (DVA). The composition contains both a primary elastomer and a primary thermoplastic resin. The weight ratio of the primary elastomer to the thermoplastic resin is in the range of about 55:45 to 80:20; preferably about 60:40 to about 75:25; more preferably about 65:35 to about 70:30. Generally, the term "dynamic vulcanization" is used to denote a vulcanization process in which a thermoplastic resin and at least one vulcanizable rubber are mixed under conditions of high shear and elevated temperature in the presence of a curing agent or curing system for the rubber(s). As a result, the rubber is simultaneously crosslinked and dispersed as particles, preferably in the form of a microgel, within the resin which forms or is present as a continuous matrix. The resulting composition is known in the art as a "dynamically vulcanized alloy" or DVA. Typically, dynamic vulcanization is effected by mixing the ingredients at a temperature which is at or above the curing temperature of the rubber, and at or above the melting temperature of the resin. The unique characteristic of the dynamically vulcanized or cured composition is that, notwithstanding the fact that the rubber is cured the composition can be processed and reprocessed by conventional thermoplastic processing techniques. Scrap and or flashing can also be salvaged and reprocessed. In a typical dynamic vulcanization process, curative addition is altered so as to substantially simultaneously mix and vulcanize, or crosslink, at least one of the vulcanizable components in a composition comprising at least one vulcanizable rubber, elastomer or polymer and at least one polymer or resin not vulcanizable using the vulcanizing agent(s) for the at least one vulcanizable component. However, the dynamic vulcanization process can be modified, as described below, in order to achieve further advantages.

It will be appreciated that the vulcanizable rubber, typically the first rubber will be cured to at least 50% of the maximum state of cure of which it is capable based on the cure system, time and temperature, and typically, the state of cure of such rubber will exceed 50% of maximum cure. Since the second rubber can also comprise a vulcanizable rubber, where such second rubber is vulcanized, it too typically will be cured to at least 50% of the maximum state of cure of which it is capable based on its curative or cure system and the time and temperature at which it is processed. Alternatively, the second rubber can also be grafted, linked and/or associated with the polyamide resin, with or without the use of curatives, so that its state of cure is not a limitation, provided that it is sufficiently dispersed in a small enough particle size so as to provide the properties desired for the use to which the composition will be put. Conversely, it may be desirable to cure the rubber particles to less than the maximum state of cure of which the rubber is capable so that the flexibility, as measured, for example, by Young's modulus, of the rubber component(s) is at a suitable level for the end-use to which the composition is to be put, e.g., a tire innerliner or hose component. Consequently, it may be desirable to control the state of cure of the rubber(s) used in the composition to be less than or equal to about 95% of the maximum degree of cure of which they are capable, as described above.

Elastomer

The present invention comprises at least one rubber; preferably a butyl-type rubber or an isobutylene-containing rubber. The isobutylene-containing rubber may be halogenated; halogenated rubber is defined as a rubber having at least about 0.1 mol % halogen, such halogen selected from the group consisting of bromine, chlorine and iodine. Preferred rubbers useful in this invention include isobutylene-based homopolymers or copolymers. These polymers can be described as random copolymer of a $C_4$ to $C_{12}$ isomonoolefin derived unit, such as isobutylene derived unit, and at least one other polymerizable unit. In one embodiment of the invention, the halogenated isobutylene-based copolymer is a butyl-type rubber or branched butyl-type rubber, especially brominated versions of these elastomers.

Butyl rubbers are typically prepared by reacting a mixture of monomers, the mixture having at least (1) a $C_4$ to $C_{12}$ isoolefin monomer, preferably a $C_4$ to $C_7$ isoolefin monomer, component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment. In yet another embodiment, from 8 to 0.5 wt % of the monomer mixture is multiolefin. The isoolefin is preferably a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene. Other polymerizable monomers such as styrene and dichlorostyrene are also suitable for homopolymerization or copolymerization in butyl rubbers. One embodiment of the butyl rubber polymer useful in the invention is obtained by reacting 95 to 99.5 wt % of isobutylene with 0.5 to 8 wt % isoprene, or from 0.5 wt % to 5.0 wt % isoprene in yet another embodiment.

Halogenated butyl rubber is produced by the halogenation of the butyl rubber product described above. Halogenation can be carried out by any means, and the invention is not herein limited by the halogenation process. In one embodiment, the butyl rubber is halogenated in hexane diluent at from 4 to 60° C. using bromine ($Br_2$) or chlorine ($Cl_2$) as the halogenation agent. Post-treated halogenated butyl rubber can also be used. Halogenated butyl rubber typically has a Mooney Viscosity of about 20 to about 70 (ML 1+8 at 125° C.); for example, about 25 to about 55 in another embodiment. The halogen content is typically about 0.1 to 10 wt % based on the weight of the halogenated butyl rubber; for example, about 0.5 to 5 wt %; alternatively, about 0.8 to about 2.5 wt %; for example, about 1 to about 2 wt %.

Another useful embodiment of butyl rubber is branched or "star-branched" butyl rubber. In one embodiment, the star-branched butyl rubber ("SBB") is a composition comprising butyl rubber and a polydiene or block copolymer. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene or branching agent used to make the SBB.

The SBB used may be halogenated. In one embodiment, the halogenated star-branched butyl rubber ("HSBB") comprises a butyl rubber, either halogenated or not, and a polydiene or block copolymer, either halogenated or not. In one embodiment, the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in wt %, typically greater than about 0.3 wt %, alternatively about 0.3 to 3 wt %, or about 0.4 to 2.7 wt %.

Other useful butyl rubbers are isoolefin/styrenic copolymers. Such copolymers comprise the same a $C_4$ to $C_{12}$ isoolefins listed above for butyl rubber. Desirable styrenic monomers in the isoolefin copolymer include styrene, methylstyrene, chlorostyrene, methoxystyrene, indene and indene derivatives, and combinations thereof. One particular useful isoolefin/styrenic copolymer is a random copolymer comprising a $C_4$ to $C_{12}$ isoolefin, most preferably a $C_4$ to $C_7$ isoolefin including isobutylene, and an alkylstyrene. The alkyllstyrene may be an ortho-, meta-, or para-alkyl-substituted styrene. In one embodiment, the alkyllstyrene is a p-alkylstyrene containing at least 80%, more preferably at least 90% by weight of the para-isomer. The copolymer may be halogenated via any halogen, desirably chlorine or bromine, most preferably bromine. The copolymer may also include functionalized interpolymers wherein at least some of the alkyl substituent groups present on the styrene monomer units contain benzylic halogen or another functional group described further below. These interpolymers are herein referred to as "isoolefin copolymers comprising a haloalkylstyrene" or simply "isoolefin copolymer." The alkyl substitution on the styrene is selected form $C_1$ to $C_7$ alkanes and $C_2$ to $C_7$ alkenes. A particularly useful alkylstyrene is methylstyrene.

Most useful of such isoolefin/alkylstyrene copolymers are isobutylene/p-methylstyrene copolymers containing from 0.5 to 20 mol % p-methylstyrene wherein up to 60 mol % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed halogenated poly(isobutylene-co-p-methylstyrene) or brominated poly(isobutylene-co-p-methylstyrene) (BIMSM). These functionalized polymers preferably have a substantially homogeneous compositional distribution such that at least 95% by weight of the polymer has a p-alkylstyrene content within 10% of the average p-alkylstyrene content of the polymer. More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers are brominated polymers which generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mol % of bromine, based on the weight of the polymer, more preferably about 0.1 to about 1.25 mol % bromine, and are substantially free of ring halogen or halogen in the polymer backbone chain. In one embodiment of the invention, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM D1646, modified) is about 30 to about 60 Mooney units.

Secondary Elastomers

Optionally, other rubbers or elastomers can be used in combination with the primary elastomer. Such an optional rubber component includes high diene rubbers and their hydrates. High diene content rubbers or elastomers are also referred to as high diene monomer rubber. It is typically a rubber comprising typically at least 50 mol % of a $C_4$-$C_{12}$ diene monomer, typically at least about 60 mol % to about 100 mol %; more preferably at least about 70 mol % to about 100 mol %; more preferably at least about 80 mol % to about 100 mol %. Useful high diene monomer rubbers include homopolymers and copolymers of olefins or isoolefins and multiolefins, or homopolymers of multiolefins. Generally, other optional rubbers useful in the present invention include, for example natural rubber (NR), isoprene rubber (IR), epoxylated natural rubber, styrene butadiene rubber (SBR), polybutadiene rubber (BR) (including high cis BR and low cis BR), nitrile butadiene rubber (NBR), hydrogenated NBR, hydrogenated SBR, olefin rubbers (for example, ethylene propylene rubbers (including both EPDM and EPM), maleic acid-modified ethylene propylene rubbers (M-EPM), isobutylene and aromatic vinyl or diene monomer copolymers, acrylic rubbers (ACM), ionomers, other halogen-containing rubbers (for example, chloroprene rubbers (CR), hydrin rubbers (CHR), chlorosulfonated polyethylenes (CSM), chlorinated polyethylenes (CM), maleic acid-modified chlorinated polyethylenes (M-CM)), silicone rubbers (for example, methylvinyl silicone rubbers, dimethyl silicone rubbers, methylphenylvinyl silicone rubbers), sulfur-containing rubbers (for example, polysulfide rubbers), fluoro rubbers (for example, vinylidene fluoride rubbers, fluorine-containing vinyl ether-based rubbers, tetrafluoroethylene-propylene rubbers, fluorine-containing silicone rubbers, fluorine-containing phosphagen rubbers), thermoplastic elastomers (for example, styrene-containing elastomers, olefin elastomers, ester elastomers, urethane elastomers, or polyamide elastomers), and their mixtures.

Preferred examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures.

A second rubber component that is more efficient in reducing low temperature modulus than BIMSM can be advantageous for improving low temperature performance of the overall composition. Preferably, the secondary rubber is based on functionalized rubbers exhibiting low glass transition temperatures, Tg, preferably less than −30° C. The low Tg contributes to reduced modulus (enhanced softness) of the secondary rubber at operating or use temperatures of products containing such rubbers, for example, tire innerliners, of about −20° C. or less. Suitable functionality includes maleic anhydride, acyllactam, or others that can readily react with amine functionality present in polyamides. The presence of chemically reactive functionality in such rubbers further promotes reactive compatibilization between the secondary rubber and polyamide leading to a small particle size dispersion of the rubber in the polyamide matrix, the particles exhibiting an average particle size of about 1 micron or less; preferably less than about 0.5 micron. The secondary rubber, dispersed in the polyamide matrix in the form of small particles, as noted, can optionally be cured, crosslinked or vulcanized, partially, substantially or fully, as described with regard to the halogenated or BIMSM elastomer. Such crosslinking can be accomplished in the course of dispersing the secondary rubber in the polyamide matrix by using the same dynamic vulcanization method applied to the halogenated elastomer component. If dynamic vulcanization is used, it is also necessary to disperse a suitable curing agent or curing system in the secondary rubber in order to effect vulcanization during mixing and dispersion of the rubber. Alternatively, if the secondary rubber is susceptible to thermal crosslinking, it can be vulcanized by the application of sufficient thermal energy either during mixing and dispersion in a manner corresponding to dynamic vulcanization, or after it is dispersed in the form of small particles by providing sufficient thermal energy to accomplish such crosslinking after dispersion. In any event, it is preferred that the secondary rubber be dispersed in the polyamide matrix in the form of small particles having an average particle size of about 0.1 micron to about 1 micron; for example about 0.1 micron to about 0.75 micron; or about 0.1 micron to about 0.5 micron.

Secondary polymers may also function as compatibilizers and can include ethylenically unsaturated nitrile-conjugated diene-based high saturation copolymer rubbers (HNBR), epoxylated natural rubbers (ENR), NBR, hydrin rubbers, acryl rubbers and mixtures thereof. Other compatibilizers include copolymers such as those having the structure of both or one of the thermoplastic resin and rubber polymer or a structure of a copolymer having an epoxy group, carbonyl group, halogen group, amine group, maleated group, oxazoline group, hydroxy group, etc. capable of reacting with the thermoplastic resin or rubber polymer. The secondary rubber can be selected based upon the type of the thermoplastic resin polymer and rubber polymer to be mixed. Such useful secondary rubbers include maleic anhydride grafted rubbers such as maleic anhydride grafted acrylonitrile-butadiene-styrene, maleic anhydride grafted ethylene-propylene-diene rubber, maleic anhydride grafted styrene-ethylene/butadiene-styrene, and the like and maleated ethylene copolymer rubbers such as maleated ethylene-propylene (EPM), maleated ethylene-butene, maleated ethylene-hexene, maleated ethylene-octene, maleated ethylene-decene, maleated ethylene-propylene-diene, maleated ethylene-vinyl acetate, maleated ethylene-methyl acrylate, maleated ethylene-ethyl acrylate, maleated ethylene-acrylic acid, and the like and mixtures thereof. Also potentially useful rubbers include EPDM/styrene, EPDM/acrylonitrile graft copolymer and their maleic acid-modified forms; styrene/maleic acid copolymer; reactive phenoxy thermoplastic resin; and their mixtures.

Examples of useful, preferred functional groups present in the secondary rubber include compounds comprising a carbonyl bond such as carboxylic acids, esters of carboxylic acids, acid anhydrides, di-esters, salts, amides, and imides. Aromatic vinyl compounds, hydrolyzable unsaturated silane compounds, saturated halogenated hydrocarbons, and unsaturated halogenated hydrocarbons may also be used. Examples of particularly preferred functional groups include, but are not limited to maleic anhydride, citraconic anhydride, 2-methyl maleic anhydride, 2-chloromaleic anhydride, 2,3-dimethylmaleic anhydride, bicyclo [2,2,1]-5-heptene-2,3-dicarboxylic anhydride, and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2) oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methyl-bicyclo(2.2.1)hept-5-ene-2,3-dicarboxylic acid anhydride (XMNA).

By having another rubber, the overall rubber content, counting both BIMSM rubber and at least one secondary rubber, can be increased in the thermoplastic elastomer composition while maintaining a desirable morphology including small particle size dispersion of the rubber components in the polyamide matrix. The increase in maximum rubber content can be realized particularly in view of the restricted coalescence of the BIMSM particles when in the presence of an immiscible secondary rubber. Furthermore, by controlling the amount of the secondary rubber concentration at a low or minor level as described above, it is possible to avoid the need to cure or vulcanize the secondary rubber in order to substantially avoid or prevent its coalescence. This is particularly true since the secondary rubber is reactive in the presence of and with the polyamide and becomes substantially immobilized. Without the need to add curatives to the secondary rubber it is then unnecessary to pre-mix or to pre-compound it with curatives (although curatives can optionally be added and the secondary rubber dynamically vulcanized using the same technology as for BIMSM), and direct addition of the secondary rubber to the extruder mixer is feasible during extrusion mixing; the secondary rubber preferably is provided in pellet form. Furthermore, since most functionalized rubbers, such as maleated ethylene copolymer rubbers and maleic anhydride grafted rubbers, are fairly permeable, it is desirable to keep the secondary rubber concentration low, typically not more than 20 wt %; preferably about 1 wt % to about 20 wt %; more preferably about 1 wt % to about 10 wt % or less, based on the total weight of the overall composition. The amount of the secondary, functionalized compatibilizer rubber blended is typically not more than about 20 wt %; preferably less than about 10 wt %; generally about 0.5 wt % to about 20 wt %; for example about 5 wt % to about 15 wt %; such as about 7.5 wt % to about 12.5 wt %.

Thermoplastic Resin

For purposes of the present invention, a useful thermoplastic resin is defined to be any thermoplastic homopolymer, copolymer or mixture thereof having a Young's modulus of more than 500 MPa and, preferably, an air permeation coefficient of less than $60 \times 10^{-12}$ cc cm/cm$^2$ sec cm Hg (at 30° C.), and, preferably, a melting point of about 170° C. to about 230° C., including, but not limited to, one or more of the following:

a) polyamide resins: nylon 6 (N6), nylon 66 (N66), nylon 46 (N46), nylon 11 (N11), nylon 12 (N12), nylon 6,10 (N610), nylon 6,12 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters;

c) polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;

d) polymethacrylate resins: polymethyl methacrylate, polyethylacrylate;

e) polyvinyl resins: ethylene-vinyl acetate (EVA), polyvinyl alcohol (PVA), ethylene vinyl alcohol (EVOH), vinyl alchohol/ethylene copolymer (EVOA), polyvinylidene chloride (PVDC), polyvinyl chloride (PVC), polyvinyl/polyvinylidene copolymer, polyvinylidene chloride/methacrylate copolymer;

f) cellulose resins: cellulose acetate, cellulose acetate butyrate;

g) fluorine resins: polyvinylidene fluoride (PVDF), polyvinyl fluoride (PVF), polychlorofluoroethylene (PCTFE), tetrafluoroethylene/ethylene copolymer (ETFE);

h) polyimide resins: aromatic polyimides;

i) polysulfones;

j) polyacetals;

k) polyactones;

l) polyphenylene oxide and polyphenylene sulfide;

m) styrene-maleic anhydride;

n) aromatic polyketones; and o) mixtures of any and all of a) through n) inclusive as well as mixtures of any of the illustrative or exemplified thermoplastic resins within each of a) through n) inclusive.

For purposes of the present invention, this definition of thermoplastic resin excludes polymers of olefins, such as polyethylene and polypropylene.

Preferred thermoplastic resins include polyamide resins and mixtures thereof; particularly preferred resins include Nylon 6, Nylon 6/66 copolymer, Nylon 11, Nylon 12, Nylon 610, Nylon 612 and their blends. According to an alternative preferred embodiment of the present invention, the thermoplastic elastomer composition may be formulated using a thermoplastic resin component where the nylon resin component comprises Nylon 11 or Nylon 12, and Nylon 6/66 copolymer in a ratio of composition (ratio by weight) of about 10/90 to about 90/10; preferably about 30/70 to about 85/15. Such a thermoplastic elastomer composition based on blended resins can provide a thermoplastic elastomer composition having superior durability and appearance, e.g., of the cured surface of a tire innerliner as well as superior air retention properties, as well as demonstrating a good balance of these properties.

Other Components

Since the thermoplastic resin and the elastomer differ significantly in solubility, a compatibilizing ingredient may be useful for the purposes of enhancing compatibility of these polymers. Furthermore, without wishing to be bound by theory, the fine rubber dispersions obtained in the compositions of the present invention may be the result, in part, of chemical reaction(s) between, e.g., benzylic bromine present in BIMSM, or allylic halogen in halogenated butyl, and terminal amines in thermoplastic polyamides at the phase boundary between the dispersed rubber particles and the thermoplastic which are formed during mixing and potentially by modifying, in particular reducing, the surface tension between the rubber and thermoplastic resin components. The occurrence of interfacial reactions during blending and simultaneous reaction of two immiscible polymers can help to avoid coalescence of the small particle-size dispersed rubber phase, thereby leading to particularly fine dispersions of the rubber phase. At the same time, because of the interfacial stability in these reactive compatibilized immiscible systems, phase inversion of the higher concentration, lower viscosity polymer blend component, the rubber phase, is inhibited as a consequence of the stabilizing effect of interfacial compatibilization.

Suitable compatibilizers include ethylenically unsaturated nitrile-conjugated diene-based high saturation copolymer rubbers (HNBR), epoxylated natural rubbers (ENR), acrylate rubber, and mixtures thereof, as well as copolymers having the same structure of the thermoplastic resin or the elastomeric polymer, or a structure of a copolymer having an epoxy group, carbonyl group, halogen group, amine group, maleated group, oxazoline group, or hydroxyl group capable of reacting with the thermoplastic resin or the elastomer. Other compounds used to compatibilize the viscosity between the elastomer and thermoplastic components include low molecular weight polyamides, maleic anhydride grafted polymers having a molecular weight on the order of 10,000 or greater, methacrylate copolymers, tertiary amines and secondary diamines. Examples include maleic anhydride-grafted ethylene-ethyl acrylate copolymers (a solid rubbery material available from Mitsui-DuPont as AR-201 having a melt flow rate of 7 g/10 min measured per JIS K6710) and butylbenzylsulfonamide (BBSA).

The amount of compatibilizer is typically about 0.5 to about 10 parts by weight; preferably about 3 to about 8 parts by weight, based upon 100 parts by weight of the total of the elastomer. Alternatively stated, the amount of compatibilizer is typically about 25 to 40 phr.

As already discussed, if the amount of compatibilizer or plasticizer is relatively high, it may interfere with film formation, as well as result in bloom on pellets of the DVA during storage. It is within the scope of this invention to reduce the amount of compatibilizer in the DVA, either by the use of a different material that does not result in the same issues as already known compounds, see U.S. patent application Ser. No. 12/548,797 filed Aug. 27, 2009, by using a smaller weight percent of plasticizer, or by processing means described further herein. In such embodiment, the amount of compatibilizer is present in the total composition in amounts of 0.5 to 8 parts by weight in one embodiment, 0.5 to 5 parts by weight in another embodiment, or 0.5 to 4 parts by weight in another embodiment. Alternatively stated, for compositions with a reduced amounts of compatibilizer, the compound is present in amounts of not more than 22.5 phr, not more than 20 phr, not more than 15 phr, nor more than 10 phr, or not more than 5 phr and compatibilizer might be present in amounts of 1 phr, 2 phr, or up to 5 phr; it might be present in any range defined by one the above list maximum amounts and any one of the minimum amounts.

Generally, polymer compositions, e.g., those used to produce tires, are crosslinked in the finished tire product. Crosslinking or vulcanization is accomplished by incorporation of curing agents and/or accelerators; the overall mixture of such agents being typically referred to as a cure "system." A cure system is used because typically more than one curing agent is employed for beneficial effects, particularly where a mixture of high diene rubber and a less reactive elastomer is used.

For purposes of dynamic vulcanization in the presence of a thermoplastic resin to form, for example, a highly impermeable layer or film, any conventional curative system which is capable of vulcanizing saturated or unsaturated halogenated polymers may be used to vulcanize at least the elastomeric halogenated copolymer of a $C_4$ to $C_7$ isomonoolefin and a para-alkylstyrene. Peroxide curatives are specifically excluded from the practice of this invention when there is present one or more thermoplastic resin would cause such the resins to crosslink themselves in the presence of peroxide, resulting in an excessively cured, non-thermoplastic composition. Crosslinking or curing agents include at least one of, e.g., sulfur, zinc oxide, and fatty acids and mixtures thereof. Generally, polymer compositions may be crosslinked by adding curative agents, for example sulfur, metal oxides (i.e., zinc oxide, ZnO), organometallic compounds, radical initiators, etc. and heating the composition or mixture. The following are common curatives that can function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., the stearate salts of Zn, Ca, Mg, and Al), or with stearic acid, and either a sulfur compound or an alkylperoxide compound. Suitable curative systems for the elastomeric halogenated copolymer component of the present invention include zinc oxide in combination with zinc stearate or stearic acid and, optionally, one or more of accelerators or vulcanizing agents.

Curative accelerators include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of rubber involves complex interactions between the curative, accelerator, activators and polymers. Ideally, all of the available curative is consumed in the formation of effective crosslinks which join individual polymer chains to one another and enhance the overall strength of the polymer matrix. Numerous accelerators are known in the art. Curatives, accelerators and the cure systems of which they are a part that are useful with one or more crosslinkable polymers are well-known in the art.

The cure system can be dispersed in a suitable concentration into the rubber component, the rubber component optionally containing one or more filler, extender and/or plasticizer by, e.g., mixing the rubber and the cure system components in a process step prior to addition of the rubber-containing composition to the thermoplastic using any mixing equipment commonly used in the rubber industry for such purpose, e.g., a two-roll rubber mill, a Banbury mixer, a mixing extruder and the like. Such mixing is commonly referred to as "accelerating" the rubber composition. Alternatively, the rubber composition can be accelerated in a stage of a mixing extruder prior to carrying out dynamic vulcanization, although this is difficult to control in a commercial, practical, integrated process and is less desirable. It is particularly preferred that the cure system be dispersed in the rubber phase, or in a rubber composition also optionally including one or more fillers, extenders and other common ingredients for the intended end-use application, prior to the addition of the rubber to the thermoplastic resin(s) in the mixing equipment in which it is intended to carry out dynamic vulcanization. By so doing, the pre-compounded rubber composition can be pelletized for more efficient and effective feeding to the dynamic vulcanization equipment, preferably a mixing extruder, as described below.

In one embodiment of the invention, at least one curing agent is typically present at about 0.1 to about 15 phr; alternatively at about 0.5 to about 10 phr.

The compositions described herein may have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black, modified carbon black such as silica treated or silica coated carbon black, and the like. Reinforcing grade carbon black is preferred. A particularly useful grade of carbon black is Mitsubishi Carbon Black grade MA600, also identified as a medium color furnace black. However, carbon black, if used at all, is typically no more than about 5 parts per hundred of rubber (phr); preferably less than about 4 phr; more preferably less than about 3 phr; most preferably less than about 2 phr; for example, about 1 phr or less, such as about 0.1 to about 1.5 phr; for example about 0.25 to about 1.0 phr. Alternatively, useful compositions can be prepared without carbon black. The filler may also include other reinforcing or non-reinforcing materials such as silica, clay, calcium carbonate, talc, titanium dioxide and the like. The filler may be present at a level of from 0 to about 5 percent by weight of the rubber present in the composition; such as about 0.5 to about 4 wt. %; or about 1.0 to about 3 wt. %; such as about 1 to about 2 wt %.

A process oil may be present in air barrier compositions. Such oils are primarily used to improve the processing of the composition during preparation of the layer, e.g., mixing, calendering, etc. Generally, the process oil may be selected from paraffinic oils, aromatic oils, naphthenic oils, and polybutene oils. Rubber process oils also have ASTM designations depending on whether they fall into the class of paraffinic, naphthenic or aromatic hydrocarbonaceous process oils. The type of process oil utilized will be that customarily used in conjunction with a type of elastomer component and a skilled rubber chemist will recognize which type of oil should be utilized with a particular rubber in a particular application. For a thermoplastic elastomer composition the oil may be present at a level of 0 to about 20 wt % of the total composition; preferably oil is not included in order to maximize impermeability of the composition.

The preferred polymer components comprise halogenated isobutylene-containing copolymers as the vulcanizable component(s), e.g., halogenated butyl such as chlorinated butyl or brominated butyl, and brominated isobutylene-p-methylstyrene copolymer (BIMSM copolymer), and a thermoplastic polymer such as nylon or a blend of various nylon polymers. It is particularly preferred that the dynamically vulcanized compositions of the present invention comprise the halogenated rubber component(s) in the form of dispersed, substantially fully cured, small particles in a continuous matrix of thermoplastic.

Having described components useful in the thermoplastic elastomeric composition of the present invention, the following paragraphs describe the efficient methods for producing such compositions.

Preparation of Thermoplastic Elastomeric Material

Dynamic vulcanization can be carried out in various types of commercial equipment generally available in the rubber and plastics industry including Banbury® internal mixers, roll mixers, and mixing extruders. A preferred mixing device is a twin-screw extruder with intermeshing screws. Mixing is generally conducted under such time and temperature conditions that the dispersed rubber particles, particularly the first rubber component, are dispersed and cured and/or interact with the thermoplastic resin to the extent necessary to maintain their stability, i.e., to avoid coalescence of such particles at the completion of mixing the composition. A suitable range of dynamic vulcanization temperatures is typically from about the melting temperature of the resin(s) to less than about 300° C.; for example, the temperature may range from about the melting temperature of the matrix resin(s) to about 275° C.; preferably about 230° C. to about 265° C.; alternatively, about 235° C. to about 260° C.; such as about 240° C. to about 260° C.; for example, about 230° C. to about 250° C. Alternatively, dynamic vulcanization can be carried out at a temperature range from about 10° C. to about 50° C. above the melting temperature of the matrix resin; more preferably about 20° C. to about 40° C. above the melting temperature of the thermoplastic resins, which is preferably a polyamide or mixed polyamide thermoplastic matrix.

Other methods of reducing the amount of plasticizer may be accomplished as the materials are blended together in the mixer. In one embodiment, as the rubber, thermoplastic resin are blended, the mixing temperature is sufficient to volatize some of the plasticizer. For such an embodiment, the mixer/extruder will be fitted with means to sparge the volatized plasticizer from the mixer.

Figure 1:
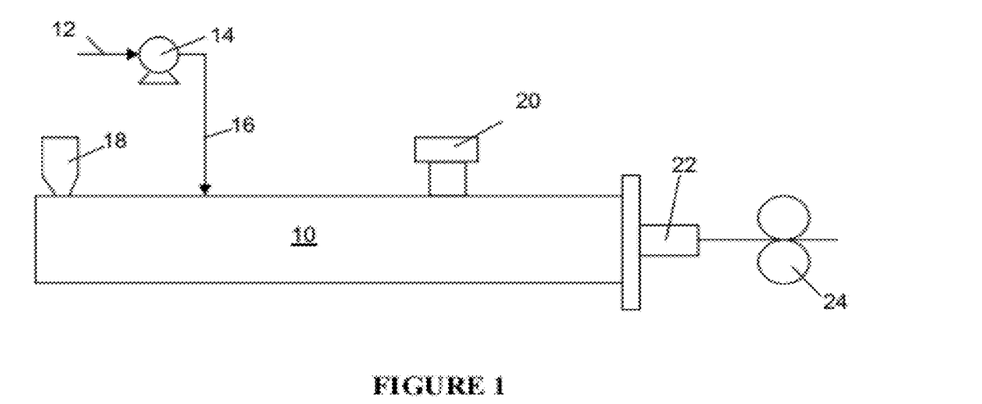
FIG. 1 is a schematic of an extruder wherein supercritical fluid is injected into the extruder.
Figure 2:
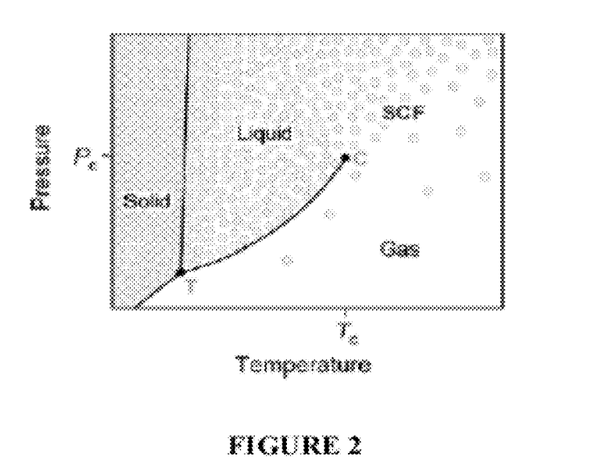
FIG. 2 is a phase diagram for supercritical fluids.

In another embodiment, the plasticizer, in particular a BBSA, is added in an amount of less than 5 wt %, preferably 0 wt %, is added to the composition. To compatibilize the viscosity of the elastomer and the thermoplastic resin, a supercritical fluid is injected into the mixer 10, see FIG. 1. A supercritical fluid is a compound that, at defined temperature and pressure conditions, has indistinguishable vapor and liquid phases; the density of the supercritical fluid can be varied by changing the pressure or temperature of the fluid, see FIG. 2. In this embodiment, a gas 12, such as $CO_2$, $N_2$, $H_2$, He, or other inert gas, is compressed via a compressor 14 so that the gas passes above the gas's thermodynamic critical point and has properties of both a liquid and a gas. For $CO_2$, the supercritical temperature and pressure are, respectively, 31° C. and 7.38 MPa; for N2, the supercritical temperature and pressure are, respectively, −147.1° C. and 3.39 MPa. Once the gas has entered a supercritical state, the supercritical gas 16 is feed into the mixer 10 in at least one location downstream of the mixer feed throat 18; the gas 16 may have multiple or alternative feed points into the mixer 10. The exact feed point of the gas 16 into the mixer 10 will depend on the DVA composition and desired conditions in the mixer 10. In the mixer 10, the supercritical gas 16 dissolves into the thermoplastic resin and acts as a liquid plasticizer, reducing the thermoplastic viscosity and facilitating the desired morphology of the elastomer and thermoplastic resin. After sufficient mixing of the components in the mixer 10, the gas 16 is vented via a downstream vent 20. The DVA exits the mixer 10 and may be subjected to further processing to form a cast film, a blown film, or shaped into strands and pelletized for storage and later use. FIG. 1 illustrates one embodiment wherein the DVA passes through a slit die 22 and rolls 24 to form a DVA cast film. The illustrated process has the benefit of combining the DVA manufacturing and film fabrication into a single process. In embodiments wherein the DVA is being pelletized, the extruded DVA strand is passed through a water trough for cooling and then sent through a pelletizer.

Another embodiment within the scope of the present invention to reduce the plasticizer in the final film is to blend the DVA composition in accordance with any of the above described embodiments using a conventional or relatively low level of plasticizer and then pass the DVA material through a fluidized bed heater. Fluidized bed heaters are known in the plastics field for drying small particle materials. In passing the DVA pellets through a fluidized bed heater, excess plasticizer will bloom to the surface of the pellets and be volatized from the pellet surface.

In accordance with the present invention, the thermoplastic elastomer composition thus obtained is structured with the relatively greater weight amount of the elastomer forming a discontinuous phase dispersed as a dispersion phase (domain) in a matrix of the relatively smaller weight amount of thermoplastic resin which forms a continuous phase. The dynamically vulcanized rubber component is preferably dispersed in the thermoplastic resin in the form of small particles having an average particle size of about 0.1 micron to about 1 micron; for example about 0.1 micron to about 0.75 micron; or about 0.1 micron to about 0.5 micron. Particle size can be determined by methods well known in the art and including tapping phase atomic force microscopy (AFM).

As a consequence of dynamic vulcanization and the thermoplastic resin forming a continuous phase in the material, the composition has both thermoplastic and elastomeric properties and can be readily processes as a thermoplastic material.

Film Formation

Any of the above embodiments of the DVA composition mixed under dynamic vulcanization processes to form a DVA is processable to form a useable film. In accordance with one embodiment of the present invention, the DVA is first formed into a film, preferably a thick film preform, and then rolled through successively tighter pairs of rolls until the film has obtained the desired final thickness, see FIG. 3. The film formation is preferably done immediately after the DVA composition is blended, i.e. prior to any other forming of the DVA such as pelletization.

Figure 3:
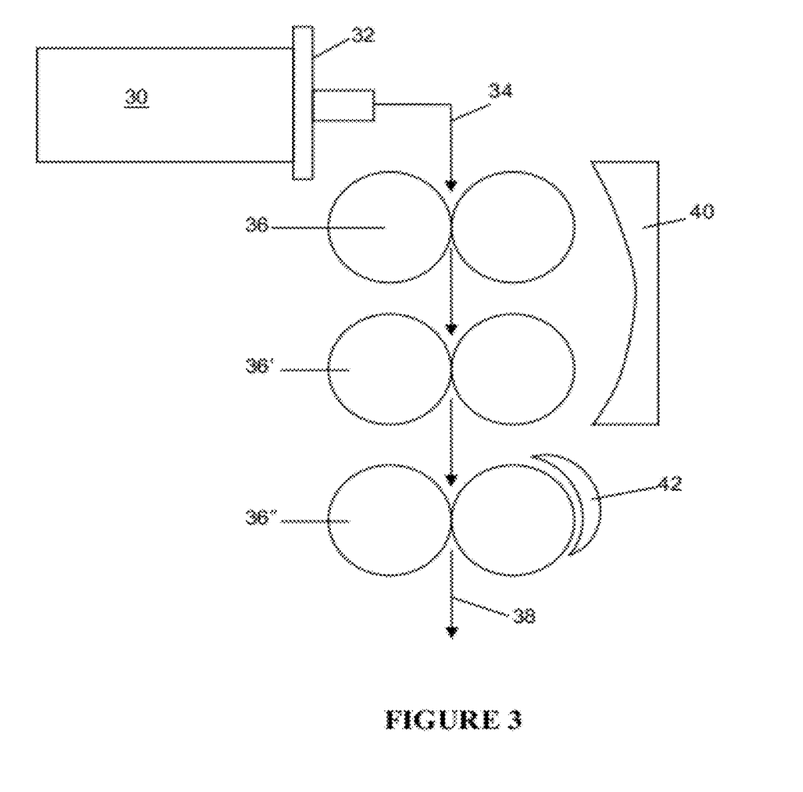
FIG. 3 is a schematic of film processing in accordance with one embodiment.

The initially formed film may be obtained by consolidating the thermoplastic elastomeric material into a preform by hot pressing, sintering, ram extrusion, or extrusion as illustrated in FIG. 1. In FIG. 3, the thermoplastic elastomeric material is masticated in a mixer 30, feed through a slit die 32 to form a thick film 34. The use of a large die gap 32 with the extruder does not lead to a large pressure drop despite the extruded material having a high viscosity. In one embodiment of the present invention, when using an extruder to form the thick film 34, the mixer 30 may be provided with means to vacuum vent or sparge any volatized plasticizer.

Figure 4:
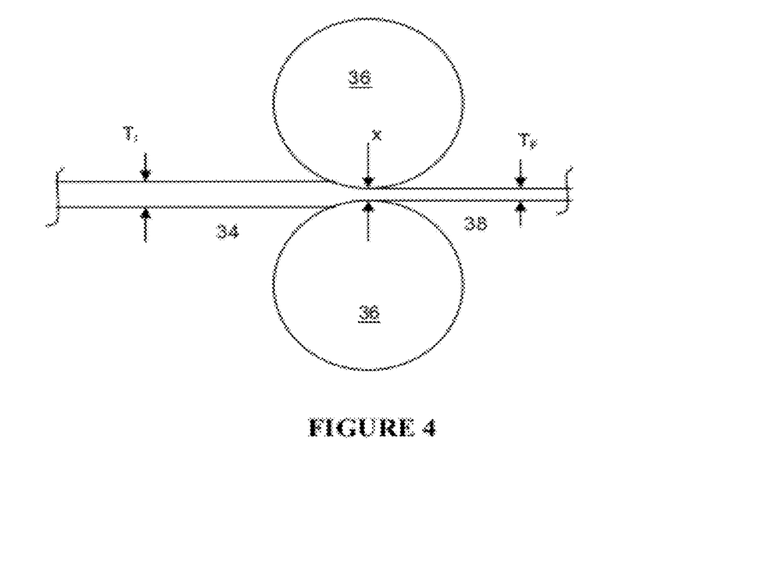
FIG. 4 illustrates the film as it passes between a set of rolls.

The thick film 34 has a cross-sectional thickness $T_1$ in the range of 10.0 mm to 0.1 mm, see FIG. 4; alternatively, the thick film 34 has an initial thickness $T_1$ in any of the ranges of 5 mm to 0.1 mm, 5 to 1 mm, or 1 to 0.1 mm. The thick film is passed through at least one set of rolls 36, 36', 36". The temperature of the rolls is selected to obtain the desired reduction in film thickness and may be heated as little or as much as necessary, depending on both the amount of thickness reduction and the film composition. For at least the first set of rolls 36, the temperature is at or above the melt temperature of the thermoplastic resin. The temperature of the first set of rolls 36 should not be more than 100° greater than the melt temperature of the thermoplastic resin to prevent degradation of the material. When using more than one set of rolls, the temperature for each set of rolls may be constant across all of the sets of rolls 36, 36', 36", or a temperature gradient may exist across the sets of rolls 36, 36', 36". The temperature of the last set of rolls 36" may be selected so that the last set 36" operates as chilling rollers to cool and set the exiting thermoplastic elastomeric film 38 wherein the film 38 may be quickly wound upon a storage roll or creel without concerns for additional cooling.

Each set of rolls is defined by a nip distance, x. The nip distance x may be adjusted per conventional known method for heated roll sets. As the rolled film 38 exits the roll nip, the film thickness $T_F$ will be substantially equal to the nip distance x; due to some rebound characteristics of the film, the film thickness $T_F$ may expand slightly as it exits the roll nip. When using multiple sets of rolls 36, 36', 36", the nip distance x between the rolls in each set will decrease along the film path. In an alternative embodiment, for a constant width film, the speed of the rolls increases along the film path to obtain a 'drawn-down' effect on the film. In another embodiment, the roll sets may both have a decreasing nip distance x and an increasing speed along the film path.

The film thickness, as it passes through the set of rolls is reduced by at least 25% of the cross-sectional thickness; alternatively the film thickness is reduced by at least 40%, by at least 50%, by at least 65%, or by at least 75% thickness. The actual physical final film thickness is determined by the end use application of the film. For use as a barrier material in a tire, i.e. an innerliner, the final film thickness is in the range of 0.01 to 1.0 mm, or alternatively in any one of the ranges of 0.01 to 0.05 mm, 0.01 to 0.10 mm, 0.01 to 0.5 mm, 0.01 to 0.95 mm, 0.05 to 1.0 mm, 0.05 to 0.95 mm, or 0.05 to 0.5 mm.

In another embodiment, along the film path, means 40 may be provided to collect any volatized plasticizer that is released from the film thickness is reduced. While reduction or collection of the plasticizer/compatibilizer is desired, In some end use applications of the DVA, it is desireable to provide an adhesive layer on the DVA material. In the illustrated set-up, the last roll set is provided with means 42 to supply an adhesive material to one of the rolls wherein the film is laminated with an adhesive layer; the adhesive coating may be provided at a roll set is suitable with the adhesive being provided. The present invention is not limited by the adhesive formulation, and any adhesive that may be applied in a liquid, semi-liquid, or plastic state that will act as a suitable adhesive between the thermoplastic elastomeric material and the substrate to which the thermoplastic material is to be bonded is acceptable. For examples of suitable adhesives, attention is directed to US Patent Publication 2008-0314491 and U.S. patent application Ser. No. 12/838,076, filed Jul. 16, 2010.

The thermoplastic elastomer composition is useful as an air permeation preventive layer, e.g., an innerliner of a pneumatic tire, an innertube, a component or layer in a hose, or as an airsleeve or airbag. Furthermore, the low permeability characteristics of the composition are suitable for uses with fluids other than gasses, e.g., liquids such as water, hydraulic fluid, brake fluid, heat transfer fluid, etc., provided that the layer in direct contact with the fluid has suitable resistance to the fluid being handled.

The invention, accordingly, provides the following embodiments:

A. A process to form a thermoplastic elastomeric material, the thermoplastic elastomer comprising an elastomer and a thermoplastic resin, the elastomer and the thermoplastic resin being present in a weight ratio in the range of 55:45 to 80:20, the process comprising injecting a supercritical fluid into the thermoplastic elastomeric material as the material is mixed in an extruder; and mixing the material under conditions such that the thermoplastic elastomeric material is dynamically vulcanized wherein the elastomer forms a discontinuous dispersed of small particles in a continuous phase of the thermoplastic resin;

B. The process of paragraph A, wherein the supercritical fluid is an inert gas;

C. The process of paragraph A or B, wherein the supercritical fluid is $CO_2$ or $N_2$;

D. The process of paragraph A, B, or C, wherein the pressure in the extruder is above the supercritical pressure of the supercritical fluid;

E. The process of any one of or any combination of paragraphs A to D, wherein the supercritical fluid is injected in the extruder downstream of an inlet feeder for the elastomer and thermoplastic resin;

F. The process of any one of or any combination of paragraphs A to E, wherein the process further comprises removing the dynamically vulcanized material from the extruder and directly forming the extruded dynamically vulcanized material into a film;

G. The process of paragraph F, wherein the process further comprises passing the film through at least one set of rolls wherein the cross-sectional thickness of the film is reduced;

H. The process of paragraph G, wherein the thermoplastic elastomeric film, prior to reduction of the cross-sectional thickness, has a thickness in the range of 0.1 to 10 mm;

I. The process of paragraph G or H, wherein the cross-sectional thickness of the thermoplastic elastomeric film is reduced by at least 50% at passes through the at least one set of hot rolls;

J. A process to prepare a thermoplastic elastomeric material film, the process comprising preparing a thermoplastic elastomeric material, the thermoplastic elastomer comprising an elastomer and a thermoplastic resin, wherein the elastomer and the thermoplastic resin are present in a weight ratio in the range of 55:45 to 80:20; forming the thermoplastic elastomeric material into a film; and passing the film through at least one set of rolls wherein the cross-sectional thickness of the film is reduced;

K. The process of paragraph J wherein the at least one set of rolls are heated to a temperature at or above the melt temperature of the thermoplastic resin;

L. The process of paragraph J or K wherein, either during or after preparing the thermoplastic elastomeric material, the amount of a plasticizer in the thermoplastic elastomeric material is reduced;

M. The process of paragraph L, wherein the plasticizer is reduced by removal of any plasticizer that is volatized during or after preparation of the thermoplastic elastomeric material;

N. The process of paragraph L, wherein the plasticizer is reduced by the composition containing less plasticizer, on a per weight or parts per hundred rubber basis, than is conventionally used;
O. The process of any one or any combination of paragraphs J to N, wherein, after preparing the thermoplastic elastomeric material, the material is passed through a fluidized bed dryer;
P. The process of any one or any combination of paragraphs J to O, wherein the thermoplastic elastomeric material is initially formed into a film by ram extrusion, hot pressing, or sintering of the thermoplastic elastomeric material;
Q. The process of any one or any combination of paragraphs J to P, wherein the thermoplastic elastomeric film, prior to reduction of the cross-sectional thickness, has a thickness in the range of 0.1 to 10 mm;
R. The process of any one or any combination of paragraphs J to Q, wherein the cross-sectional thickness of the thermoplastic elastomeric film is reduced by at least 50% at passes through the at least one set of hot rolls;
S. The process of any one or any combination of paragraphs J to R, wherein the reduced cross-sectional thickness of the thermoplastic elastomeric film is in the range of 0.01 to 0.95 mm;
T. The process of any one or any combination of paragraphs J to S, wherein as the film passes through the at least one set of hot rolls, a layer of adhesive is applied to at least one facing surface of the film;
U. The process of any one of or any combination of paragraphs A to T, wherein the elastomer is derived from $C_4$ to $C_{12}$ isoolefin monomers and the thermoplastic resin is selected from the group consisting of polyamide resins, polyester resins, polynitrile resins, polymethacrylate resins, polyvinyl resins, cellulose resins, fluorine resins, polyimide resins, polysulfones, polyacetals, polyactones, styrene-maleic anhydrides, aromatic polyketones, and mixtures thereof;
V. The process of any one of or any combination of paragraphs A to U wherein the amount of plasticizer in the thermoplastic elastomeric material in the amount of not more than 22.5 phr, not more than 20 phr, not more than 15 phr, not more than 10 phr, not more than 5 phr, about 0.1 phr, essentially zero phr (wherein 'essentially zero' is less than 0.01 phr), about 1 phr, about 2 phr, or any value in the ranges of 22.5 to 1, 2, or 5 phr, 20 to 1, 2, or 5 phr, 15 to 1, 2 or 5 phr, 10 to 1, 2, or 5 phr, or 5 to 1 phr;
W. A film made by the process of any one or any combination of paragraphs A to V; and
X. The film of paragraph W, wherein the film is used as a barrier layer in a multi-layered article such as a hose, tire, tire curing bladder, air bladder, or air spring sleeve.

EXAMPLES

Samples were prepared to demonstrate the use of supercritical fluid as a substitute for plasticizer in the thermoplastic elastomeric material and to evaluate the resulting morphology of the DVA. The following materials were used for the components employed in the Examples:

TABLE 1

| Material Designation | Material | Commercial Name/ Potential Source (if applicable) |
|---|---|---|
| BIMSM | Brominated poly(isobutylene-co-paramethylstyrene) | |

TABLE 1-continued

| Material Designation | Material | Commercial Name/ Potential Source (if applicable) |
|---|---|---|
| N6 | Nylon 6 | UBE 1030B; Ube |
| N6/66 | Nylon 6/66 copolymer | UBE 5033B; Ube |
| N11 | Nylon 11 | BESN; Atochem |
| Plasticizer | N-butylsulfonamide | Uniplex ® 214, Unitex Chemical Corporation |
| ZnO | Zinc oxide | Kadox 911; Horsehead Corporation |
| Stearic acid | Stearic acid | F1000 |
| Zinc Stearate | Zinc stearate | Zinc Stearate D |
| Talc | Talc | SG-2000; Nippon |

A BIMSM masterbatch was prepared by mixing the ingredients in a Banbury internal mixer at a temperature and for a time that did not cause premature curing of the BIMSM. The BIMSM masterbatch was pre-granulated using a granulator. Masterbatches of polyamide was pre-compounded with varying amounts of plasticizer to prepare thermoplastic masterbatches, see Table 2.

TABLE 2

| Formulation | Control | A | B | C |
|---|---|---|---|---|
| Elastomer masterbatch | | | | |
| BIMSM, phr | 100 | 100 | 100 | 100 |
| ZnO, phr | 0.15 | 0.15 | 0.15 | 0.15 |
| Stearic Acid, phr | 0.60 | 0.60 | 0.60 | 0.60 |
| Zinc Stearate, phr | 0.30 | 0.30 | 0.30 | 0.30 |
| Thermoplastic masterbatch | | | | |
| N6/66, phr | 63.4 | 63.4 | 63.4 | 63.4 |
| Plasticizer, phr | 27 | 20.3 | 13.5 | 6.8 |
| reduction in plasticizer | | 25% | 50% | 75% |

A first set of DVAs was prepared to demonstrate reduced load on the extruder when using supercritical fluid (SCF); the extruder set-up illustrated in FIG. 1 was used for the samples. The elastomer masterbatch and the thermoplastic masterbatch for formulation C were fed into a screw extruder using a volumetric pellet feeder. The DVAs were prepared with and without supercritical CO2 fed to the mixer. In the mixer, the orientation of the extruder screws was selected to prevent backflow of the fluid to the feedthroat of the mixer. The DVAs were prepared under the conditions set forth in Table 3.

TABLE 3

| | Control | 1 | 2 |
|---|---|---|---|
| RPM | 101 | 100 | 100 |
| Extruder Load, % | 100 | 78 | 75 |
| SCF Flow Rate, ml/min | 0 | 15 | 15 |
| SCF Pressure, kPa | 0 | 5516 | 8963 |
| Die Pressure, kPa | 3241 | 7791 | 9997 |
| Inlet Temperature, ° C. | 180 | 180 | 180 |
| Outlet Temperature, ° C. | 210 | 185 | 185 |
| Die Melt Temperature, ° C. | 215 | 198 | 198 |

As seen in Table 3, the pressure in the extruder was increased to maintain the CO2 in a supercritical state. Use of the supercritical fluid reduced extruder loads, indicating that the CO2 did, in fact, plasticize the nylon during mixing of the masterbatches.

To assess the final DVA compounds prepared using the supercritical fluid, the Control composition, as well as compositions A to C were prepared. The Control DVA was prepared without using the supercritical fluid, using the control conditions set forth in Table 3. Each composition A to C were prepared under both the control conditions above in Table 3 and under conditions 1 above. The physical properties of the resulting DVA's are set forth in Table 4.

TABLE 4

|  | Composition | | | | | |
| --- | --- | --- | --- | --- | --- | --- |
|  | Control | A | A* | B | B* | C | C* |
| Young's Modulus, MPa | 41.3 | 75 | 66 | 84 | 102 | 116 | 111 |
| Stress at Yield, MPa | 19 | 19 | 17.6 | 19.3 | 19.8 | 15.8 | 18.8 |
| Strain at Yield, % | 418 | 166 | 201 | 187 | 124 | 67 | 90 |
| Stress at Max Load, MPa | 19 | 19 | 16.9 | 19.2 | 20 | 15.8 | 19.4 |
| Strain at Max Load, % | 418 | 166 | 183 | 182 | 127.0 | 67 | 96 |
| Stress at Break, Mpa | 1.3 | 18.6 | 16.7 | 18.9 | 19.6 | 15.5 | 19.2 |
| Strain at Break, % | 445 | 178 | 187 | 192 | 130 | 71 | 99 |

*control conditions (i.e. without supercritical fluid)

As discussed above, when used the supercritical fluid is removed from the extruder at the end of processing. For each composition above, the compositions are the same, but the effective amount of plasticizer that was present during processing differs due to the temporary presence of the supercritical fluid. For each composition having a reduced BBSA amount, the Young's modulus is increased over the Control composition, as is the stress at yield and break, despite a reduction in the material elongation.

Figure 5A:
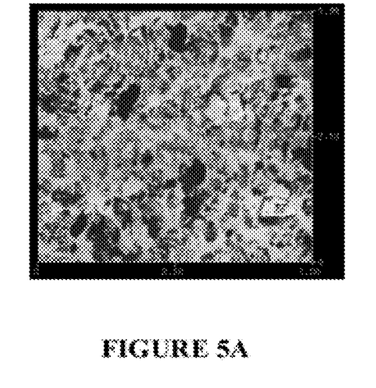
FIGS. 5A and 5B are the morphology of comparative and exemplary materials.
Figure 5B:
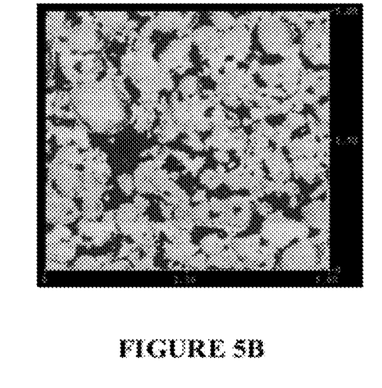

The samples of composition C were analyzed for morphology. FIG. 5A is composition C prepared without the use of the supercritical fluid; FIG. 5B is composition C prepared with the supercritical fluid. In the AFM analysis, the lighter material is the polyamide forming a continuous matrix with the darker material being the dispersed elastomer phase in the DVA. The supercritical fluid processed samples show a much lower heterogeneity in terms of the rubber concentration due to the reduced polyamide viscosity.

Based on these studies, Applicants have determined that the use of supercritical fluids may effectively replace all or part of the conventional plasticizers used in the DVA without a loss in desired morphology and material properties. Use of the supercritical fluid during processing also helps in reducing the overall melt temperature due to less viscous dissipation; such lower temperatures being better for obtaining the desired smaller particle size for the dispersed elastomeric phase in the DVA.

Any range of numbers recited in the specification hereinabove or in the claims hereinafter, such as that representing a particular set of properties, units of measure, conditions, physical states or percentages, is intended to literally incorporate expressly herein by reference or otherwise, any number falling within such range, including any subset of numbers or ranges subsumed within any range so recited.

All documents described herein are incorporated by reference herein, including any patent applications and/or testing procedures to the extent that they are not inconsistent with this application and claims. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A process to form a thermoplastic elastomeric material, the thermoplastic elastomeric material comprising an isobutylene-based elastomer and a thermoplastic resin, the isobutylene-based elastomer and the thermoplastic resin being present in a weight ratio in the range of 55:45 to 80:20, wherein the thermoplastic resin is selected from the group consisting of polyamide resins, polyester resins, polynitrile resins, polymethacrylate resins, polyvinyl resins, cellulose resins, fluorine resins, polyimide resins, polysulfones, polyacetals, polyactones, styrene-maleic anhydrides, aromatic polyketones, and mixtures thereof, the process comprising:
   a. introducing the isobutylene-based elastomer and the thermoplastic resin into an extruder and mixing the isobutylene-based elastomer and the thermoplastic resin in the extruder;
   b. injecting a supercritical fluid into the extruder downstream of the introduction of the isobutylene-based elastomer and thermoplastic resin, wherein the supercritical fluid is obtained by compressing an inert gas to a supercritical state;
   c. mixing the isobutylene-based elastomer and the thermoplastic resin in the extruder in the presence of the supercritical fluid under conditions such that the isobutylene-based elastomer is dynamically vulcanized and forms a discontinuous phase of small particles in a continuous phase of the thermoplastic resin; and
   d. through an extruder outlet die, removing the mixture obtained from step c, from the extruder as the thermoplastic elastomeric material, wherein the pressure throughout the extruder is increased so that the pressure at the extruder outlet die is greater than the pressure at which the supercritical fluid was injected into the extruder,
   wherein the supercritical fluid is vented via a vent positioned downstream of the injection of supercritical fluid and upstream of the extruder outlet die, and
   wherein the pressure and temperature in the extruder maintains the inert gas in a supercritical state as the supercritical fluid while the inert gas is in the extruder.

2. The process as claimed in claim 1, wherein the removing step comprises directly forming the extruded thermoplastic elastomeric material into a film having a thickness in the range of 0.1 to 10 mm.

3. The process as claimed in claim 2, wherein the process further comprises passing the film through at least one set of rolls so as to reduce a cross-sectional thickness of the film.

4. The process as claimed in claim 3, wherein the cross-sectional thickness of the thermoplastic elastomeric film is reduced by at least 50% as the film passes through the at least one set of rolls.

* * * * *